United States Patent
Otaki et al.

(10) Patent No.: US 10,041,628 B2
(45) Date of Patent: Aug. 7, 2018

(54) GAS FILLING APPARATUS

(71) Applicant: Tatsuno Corporation, Tokyo (JP)

(72) Inventors: Tsutomu Otaki, Tokyo (JP); Yasuyuki Tsumura, Tokyo (JP); Atsushi Takase, Tokyo (JP); Kiyoshi Kimura, Tokyo (JP); Masahiro Takezawa, Tokyo (JP); Takayuki Fuse, Tokyo (JP)

(73) Assignee: Tatsuno Corporation, Tokyo (JP)

( * ) Notice: Subject to any disclaimer, the term of this patent is extended or adjusted under 35 U.S.C. 154(b) by 22 days.

(21) Appl. No.: 15/292,539

(22) Filed: Oct. 13, 2016

(65) Prior Publication Data

US 2017/0114958 A1    Apr. 27, 2017

(30) Foreign Application Priority Data

Oct. 21, 2015   (JP) ................................. 2015-207084

(51) Int. Cl.
  *F17C 5/06*   (2006.01)
  *F17C 5/00*   (2006.01)
  *F17C 13/02*  (2006.01)

(52) U.S. Cl.
  CPC ................ *F17C 5/06* (2013.01); *F17C 5/007* (2013.01); *F17C 13/025* (2013.01);
  (Continued)

(58) Field of Classification Search
  CPC ...... F17C 5/007; F17C 13/026; F17C 13/025; F17C 2270/0168; F17C 2260/042;
  (Continued)

(56) References Cited

U.S. PATENT DOCUMENTS

| | | | |
|---|---|---|---|
| 6,085,805 A | 7/2000 | Bates | |
| 8,708,005 B2* | 4/2014 | Mori | ....................... F17C 5/007 |
| | | | 141/197 |

(Continued)

FOREIGN PATENT DOCUMENTS

| | | |
|---|---|---|
| JP | 2010001919 A | 1/2010 |
| WO | WO2011012937 | 2/2011 |

OTHER PUBLICATIONS

Extended European Search Report for EP 16 19 4410, dated Apr. 4, 2017.

*Primary Examiner* — Timothy L Maust
*Assistant Examiner* — Timothy P Kelly
(74) *Attorney, Agent, or Firm* — Stetina Brunda Garred and Brucker; Mark B. Garred (57) ABSTRACT

To provide a gas filling apparatus with high handleability and safety. A gas filling apparatus including: a filling mechanism for carrying a gas through gas carrying pipes while measuring flow rate of the gas from a gas supply source (accumulator); a filling hose connected to the gas carrying pipe and having a filling nozzle at an end of the filling hose; and an attachment sensor (nozzle attachment detecting portion) for outputting a detection signal after detecting that the filling nozzle is attached to a filling port of an in-vehicle tank, wherein filling gas to the in-vehicle tank by the filling mechanism becomes possible after the detection signal is inputted to the filling mechanism from the attachment sensor. The gas filling apparatus may further include: a pressure gauge for measuring a pressure in the in-vehicle tank; a thermometer for measuring ambient temperature; and a target pressure calculating means (comparing means) for calculating a pressure in the in-vehicle tank when filling up the in-vehicle tank or filling preset amount of the gas is finished before filling gas to the in-vehicle tank based on a capacity of the in-vehicle tank and the measured pressure in (Continued)

the in-vehicle tank and the measured ambient temperature; wherein the filling mechanism stops carrying the gas to the in-vehicle tank when the pressure in the in-vehicle tank reaches the target pressure.

5 Claims, 5 Drawing Sheets

(52) U.S. Cl.
CPC ...... *F17C 13/026* (2013.01); *F17C 2221/012* (2013.01); *F17C 2221/033* (2013.01); *F17C 2227/0157* (2013.01); *F17C 2227/0337* (2013.01); *F17C 2250/032* (2013.01); *F17C 2250/034* (2013.01); *F17C 2250/043* (2013.01); *F17C 2250/0439* (2013.01); *F17C 2250/0443* (2013.01); *F17C 2250/0478* (2013.01); *F17C 2250/0694* (2013.01); *F17C 2250/075* (2013.01); *F17C 2260/022* (2013.01); *F17C 2260/042* (2013.01); *F17C 2265/065* (2013.01); *F17C 2270/0139* (2013.01); *F17C 2270/0168* (2013.01)

(58) Field of Classification Search
CPC .......... F17C 2260/022; F17C 2250/075; F17C 2250/0694; F17C 2250/0439; F17C 2250/043; F17C 2250/032; F17C 2227/0337; F17C 2227/01; B67D 7/348
See application file for complete search history.

(56) References Cited

U.S. PATENT DOCUMENTS

2013/0052553 A1* 2/2013 Inagi ................. H01M 8/04014
429/429
2016/0305611 A1* 10/2016 Handa ..................... F17C 13/02

* cited by examiner

GAS FILLING APPARATUS

CROSS-REFERENCE TO RELATED APPLICATIONS

The present application claims priority to Japanese Patent Application No. 2015-207084 filed on Oct. 21, 2015, the disclosure of which is incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates to a gas filling apparatus for filling gas in in-vehicle tanks mounted on compressed natural gas vehicles, fuel-cell vehicles, hydrogen vehicles and the like that use a fuel such as compressed natural gas and hydrogen gas.

2. Description of the Related Art

As vehicles corresponding to environmental problems in recent years have been actively performed developments of CNG (Compressed Natural Gas) vehicles, fuel-cell vehicles, hydrogen vehicles and the like that use a fuel gas such as CNG and hydrogen. To promote the spread of vehicles that drive with the fuel gas, an apparatus for safely and efficiently filling the fuel gas in in-vehicle tanks mounted to the vehicles is required. Then, the applicant proposed, in the Japanese Patent Publication No. 2014-109350, a gas filling apparatus for efficiently filling the fuel gas in the in-vehicle tanks mounted on the vehicles.

Particularly in recent years, to promote hydrogen stations for feeding hydrogen to fuel-cell vehicles, it has been considered that self-service type gas filling apparatus are utilized by amending ministerial decrees and safety regulations.

The contents of Japanese Patent Publication No. 2014-109350 is incorporated herein by reference in its entirety.

SUMMARY OF THE INVENTION

In the hydrogen stations compared to self-service gas stations, a filling nozzle is connected to a filling port of a vehicle, so that a flow of hydrogen gas cannot to be seen. In addition, when the filling nozzle is not connected to the filling port surely, the filling nozzle is vigorously detached from the filling port by pressure of the hydrogen gas to injure a customer and there is a possibility of a disaster such as a fire and an explosion generates by the fuel gas leaked from the filling nozzle.

Then, the object of the present invention is to provide a gas filling apparatus with high handleability and safety.

In order to attain the above-mentioned object, the present invention relates to a gas filling apparatus, and the apparatus includes: a filling mechanism for carrying a gas through a gas carrying pipe while measuring flow rate of the gas from a gas supply source; a filling hose connected to the gas carrying pipe and having a filling nozzle at an end of the filling hose; and an attachment sensor for outputting a detection signal after detecting that the filling nozzle is attached to a filling port of an in-vehicle tank, wherein filling gas to the in-vehicle tank by the filling mechanism becomes possible after the detection signal is inputted to the filling mechanism from the attachment sensor.

With the present invention, by the attachment sensor, filling gas cannot be performed unless it is detected that the filling nozzle is attached to the filling port of the in-vehicle tank, so that it does not occur that the filling nozzle is detached from the filling port of the in-vehicle tank, or filling gas is continued in condition that the filling nozzle is detached, which improves safety of the gas filling apparatus.

The above gas filling apparatus can further include: a pressure gauge for measuring a pressure in the in-vehicle tank; a thermometer for measuring ambient temperature around the gas filling apparatus; and a target pressure calculating means for calculating a pressure in the in-vehicle tank when filling up the in-vehicle tank or filling preset amount of the gas is finished before filling gas to the in-vehicle tank based on a capacity of the in-vehicle tank and the measured pressure in the in-vehicle tank and the measured ambient temperature, and the filling mechanism can stop carrying the gas to the in-vehicle tank when the pressure in the in-vehicle tank reaches the target pressure. With this, insufficient or excessive filling of the gas in the in-vehicle tank can be prevented, and an appropriately amount of the gas can continuously be filled in the tank.

In addition, the above gas filling apparatus can further include means for, before filling the gas in the in-vehicle tank, calculating time that the pressure in the in-vehicle tank reaches the target pressure based on flow rate of the gas carried by the filling mechanism, and informing means for, before filling the gas in the in-vehicle tank, informing the time that the pressure in the in-vehicle tank reaches the target pressure. Since the filling nozzle completely covers the filling port of the in-vehicle tank at filling, a customer cannot confirm whether the filling is finished or not with eyesight, but with the above construction, completion of filling can be rapidly informed to the customer before or after the filling is finished.

As described above, with the present invention, it becomes possible to provide a gas filling apparatus with high handleability and safety.

BRIEF DESCRIPTION OF THE DRAWINGS

FIGS. 3(*a*) and 3(*b*) are schematic views showing a filling nozzle of the gas filling apparatus according to the present invention and a filling port of an in-vehicle tank, (a) shows a state before the filling nozzle is attached, (b) shows a state after attached;

DETAILED DESCRIPTION

Next, embodiments carrying out the present invention will be explained in detail with reference to drawings. Exemplarily explained below will be a case that a gas filling apparatus according to the present invention is a hydrogen gas filling apparatus and hydrogen gas is filled in hydrogen gas vehicles.

Figure 1:
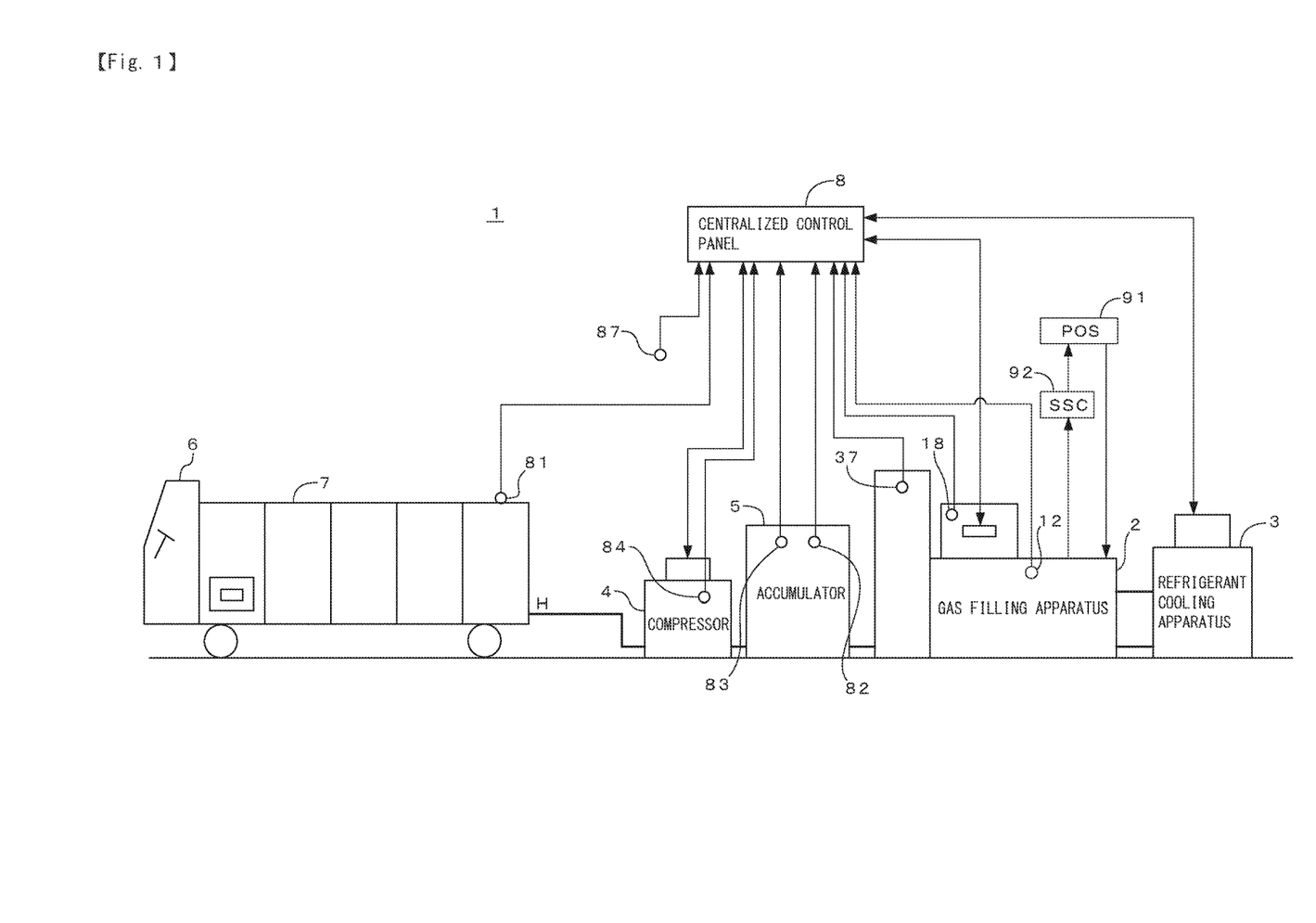
FIG. 1 is a schematic view for explaining a gas filling system to which a gas filling apparatus according to the present invention can be applicable.

First, a gas filling system to which a gas filling apparatus according to the present invention can be applicable will be explained with reference to the FIG. 1. The gas filling system 1 is mounted to fill hydrogen gas H filled in a curdle 7 loaded on a truck 6 through a compressor 4, an accumulator 5 and a gas filling apparatus 2 in in-vehicle tanks (not shown) mounted to vehicles while cooling the gas H. Meanwhile, there is a case that the hydrogen gas H filled in the curdle 7 is directly fed to the gas filling apparatus 2 from the compressor 4 not through the accumulator 5. To the gas filling apparatus 2 is connected a refrigerant cooling apparatus 3 for cooling the hydrogen gas H.

In addition, to the gas filling system 1 is mounted a centralized control panel 8, and the centralized control panel 8 controls motions of each section based on detection results from thermometers 81, 82, a pressure gauge 83, gas detectors 12, 18, 37, 84, a flame detector 87 and the like mounted to each section.

Further, a selling device for gas station (hereinafter referred to as "POS") 91 connected to the gas filling apparatus 2 is mounted in the gas filling system 1, and between the POS 91 and the gas filling apparatus 2 is mounted a self-service console (hereinafter, referred to as "SSC") 92 for outputting a filling permission after safety of filling work is confirmed.

Figure 2:
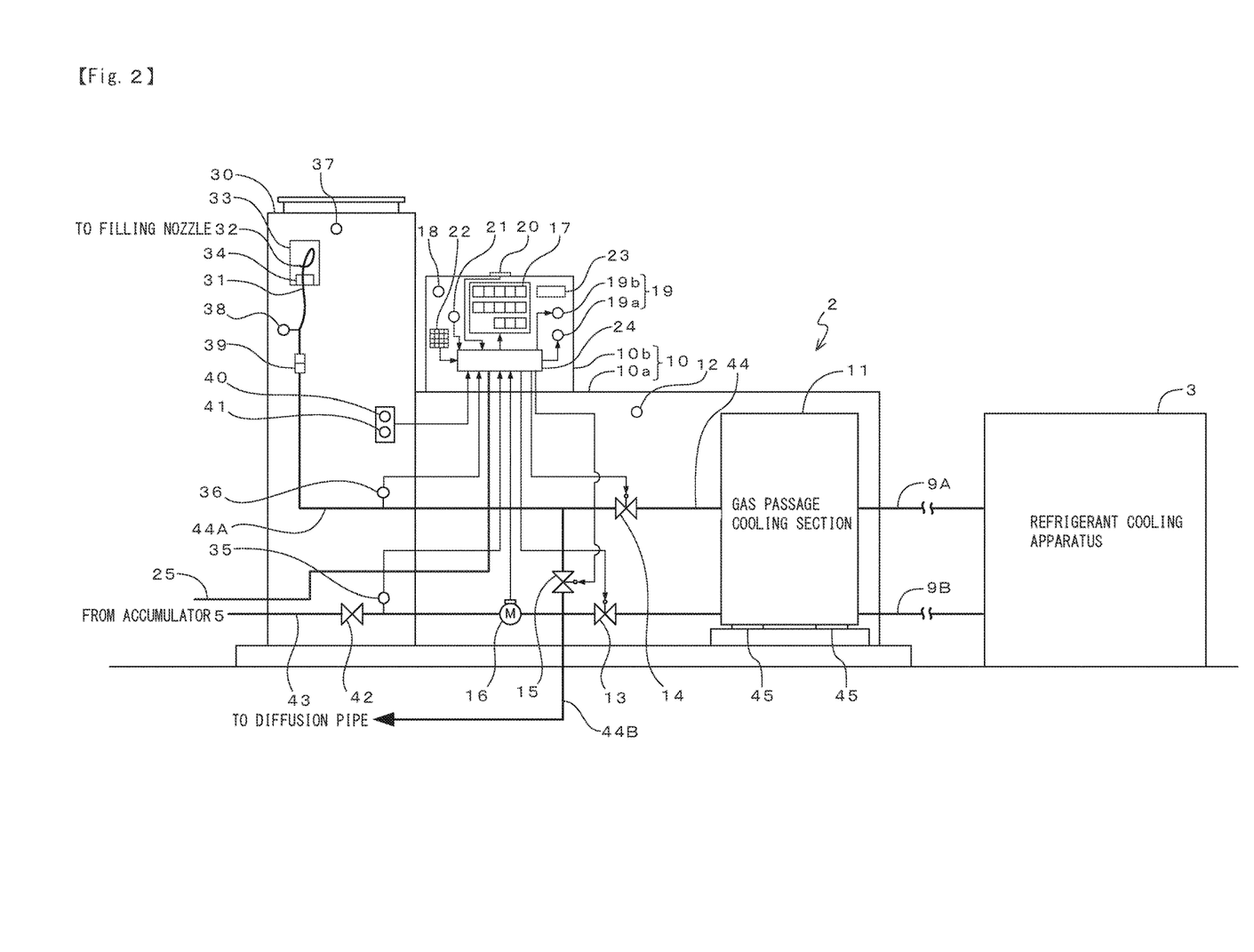
FIG. 2 is a whole configuration view showing an embodiment of the gas filling apparatus according to the present invention.

FIG. 2 shows an embodiment of the gas filling apparatus according to the present invention, and the gas filling apparatus 2 consists of a main body unit 10 and a hose unit 30, and to the main body unit 10 is connected the refrigerant cooling apparatus 3 through refrigerant carrying pipes 9A, 9B.

The main body unit 10 is composed of a filling section 10*a* having a filling mechanism for carrying the hydrogen gas H from the accumulator 5 as a gas supply source while measuring flow rate thereof and a gas passage cooling section 11 for cooling a gas carrying pipe 43, and a display section 10*b*, disposed to a ceiling portion or the like of the filling section 10*a*, for displaying filling amount of the hydrogen gas H and others.

The filling section 10*a* is provided with: a gas detector 12 for detecting gas leakage; a gas passage cooling section 11, a flow rate control valve 13 for controlling flow rate of the hydrogen gas H flowing in the gas carrying pipes 43, 44 from the accumulator 5; a shutoff valve 14 for shutting off the hydrogen gas H; a depressurizing valve 15 for decreasing pressure in the gas carrying pipe 44 after filling the hydrogen gas H is finished; a flowmeter 16 for measuring flow rate of the hydrogen gas H; and so on.

The gas passage cooling section 11 cools the hydrogen gas H flowing in the gas carrying pipe 43 by a refrigerant fed from the refrigerant cooling apparatus 3 through the refrigerant carrying pipes 9A, 9B. As the refrigerant, liquid nitrogen, Freon, carbon dioxide and the like can be used, and the refrigerant is cyclically used by cooling it in the refrigerant cooling apparatus 3. In addition, on the bottom surface of the gas passage cooling section 11 is mounted a heat insulator 45.

The gas carrying pipe 44 branches, in downstream of the shutoff valve 14 (on the side to which a following filling hose 31 is connected), into the gas carrying pipes 44A, 44B. The gas carrying pipe 44A is a pipe for filling the hydrogen gas H cooled in the gas passage cooling section 11 into the in-vehicle tanks mounted to the hydrogen gas vehicles (hereinafter, referred to as "vehicles"). The gas carrying pipe 44B is a pipe for, after filling the hydrogen gas H is finished, discharging the hydrogen gas H in the gas carrying pipe 44A outside, and is provided with a depressurizing valve 15.

The depressurizing valve 15 is a valve for, after filling the hydrogen gas H to the in-vehicle tank mounted to the vehicle is finished, decreasing a pressure in the gas carrying pipe 44, and opens/closes based on the following control. When the depressurizing valve 15 opens, the hydrogen gas H in the gas carrying pipe 44A is discharged through the gas carrying pipe 44B to a diffusion pipe, and the pressure in the gas carrying pipe 44A decreases.

The display section 10*b* is provided with: a display 17 for displaying amount of the hydrogen gas H flowing in the gas carrying pipes 43, 44 (filling amount of gas from the following filling nozzle 32 to the in-vehicle tank mounted to the vehicles) and the like; a gas detector 18 for detecting gas leakage; an alarm 19 having a speaker 19*a* and a lamp 19*b* for informing a filling completion time and kinds of defects; an area sensor 20 for monitoring a customer to prevent that the customer leaves a filling area; a human body sensor 21 for detecting existence of a person near the gas filling apparatus 2; a key board 22 for inputting a preset filling amount; an information display portion 23 for displaying the preset filling amount inputted through the key board 22; a control device 24 for controlling the whole apparatus; and an inert gas pipe 25. The construction of the control device 24 will be explained later.

The inert gas pipe 25 is mounted to fill an inert gas such as nitrogen, argon and helium in the display section 10*b* to increase pressure in the display section 10*b*. With this, when gas leakage generates in the gas filling apparatus 2, it can be prevented that a flammable hydrogen gas H flows into the display section 10*b*, and a fire generates by ignition of the hydrogen gas H.

The hose unit 30 is provided with: a filling hose 31 connected to the gas carrying pipe 44A in the filling section 10*a*; a filling nozzle 32 mounted to an end of the filling hose 31; a nozzle hook 33; a nozzle switch 34 mounted to the nozzle hook 33; pressure gauges 35, 36 for detecting pressures in the gas carrying pipes 43, 44 separately from the accumulator 5; a gas detector 37 for detecting gas leakage; a thermometer 38 for detecting temperature of the filling hose 31; a safety coupling 39 for joining the gas carrying pipe 44 and the filling hose 31; a starting switch 40 for starting filling of the hydrogen gas H to the vehicle; an emergency stopping switch 41 for urgently stopping the filling of the hydrogen gas H; a master valve 42 and so on.

Figure 3A:
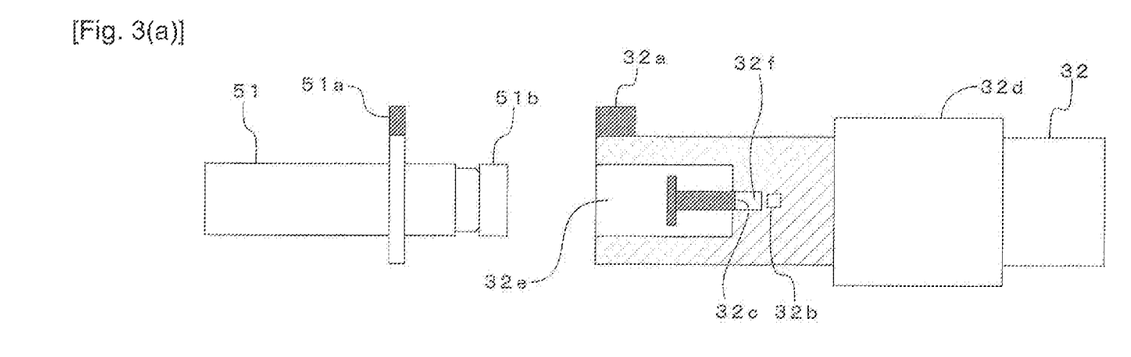

The filling nozzle 32 is, as shown in FIG. 3(*a*), provided with: a tank detecting portion 32*a* for reading an identifier printed on the tank detected portion 51*a* mounted to the filling port 51 of the in-vehicle tank on the side of the filling nozzle 32; a nozzle attachment detecting portion 32*b* for detecting approach of a nozzle attachment detected portion 32*c* as an attachment sensor; a conductive cover 32*d* and the like. The conductive cover 32*d* removes static electricity accumulated on the filling nozzle 32 and the like through the filling hose 31, a housing of the hose unit 30 and a ground (not shown).

In the identifier of the tank detected portion 51*a* of the filling port 51 is memorized the production date and the capacity of the in-vehicle tank, it can be presented by bar cord for example.

The nozzle attachment detected portion 32*c* is attached to the filling nozzle 32 so as to be slidable in a direction that the filling nozzle 32 is mounted in a hole portion 32*f* formed in a concave portion 32*e* of the filling nozzle 32. The nozzle attachment detected portion 32*c* is, before the filling nozzle 32 is attached, urged by a spring or the like (not shown) so as to be positioned as shown in FIG. 3(*a*).

Figure 3B:
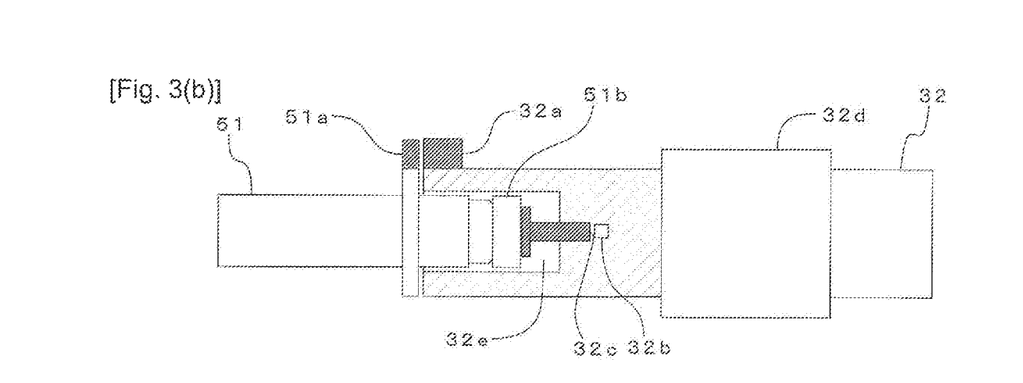

Attaching the filling nozzle 32 to the filling port 51 is, as shown in FIG. 3(*b*), performed by accommodating an end portion 51*b* of the filling port 51 in the concave portion 32*e* of the filling nozzle 32, and the attached state is maintained by attaching means not shown. With the attaching, the nozzle attachment detected portion 32c moves deep in the hole portion 32f, and the nozzle attachment detecting portion 32b detects approach of the nozzle attachment detected portion 32c, which enables the attachment of the filling nozzle 32 to be detected. Meanwhile, as the nozzle attachment detecting portion 32b, other than proximity sensors, other sensors and mechanisms for detecting that the filling nozzle 32 is attached to the filling port 51 can be utilized.

Figure 4:
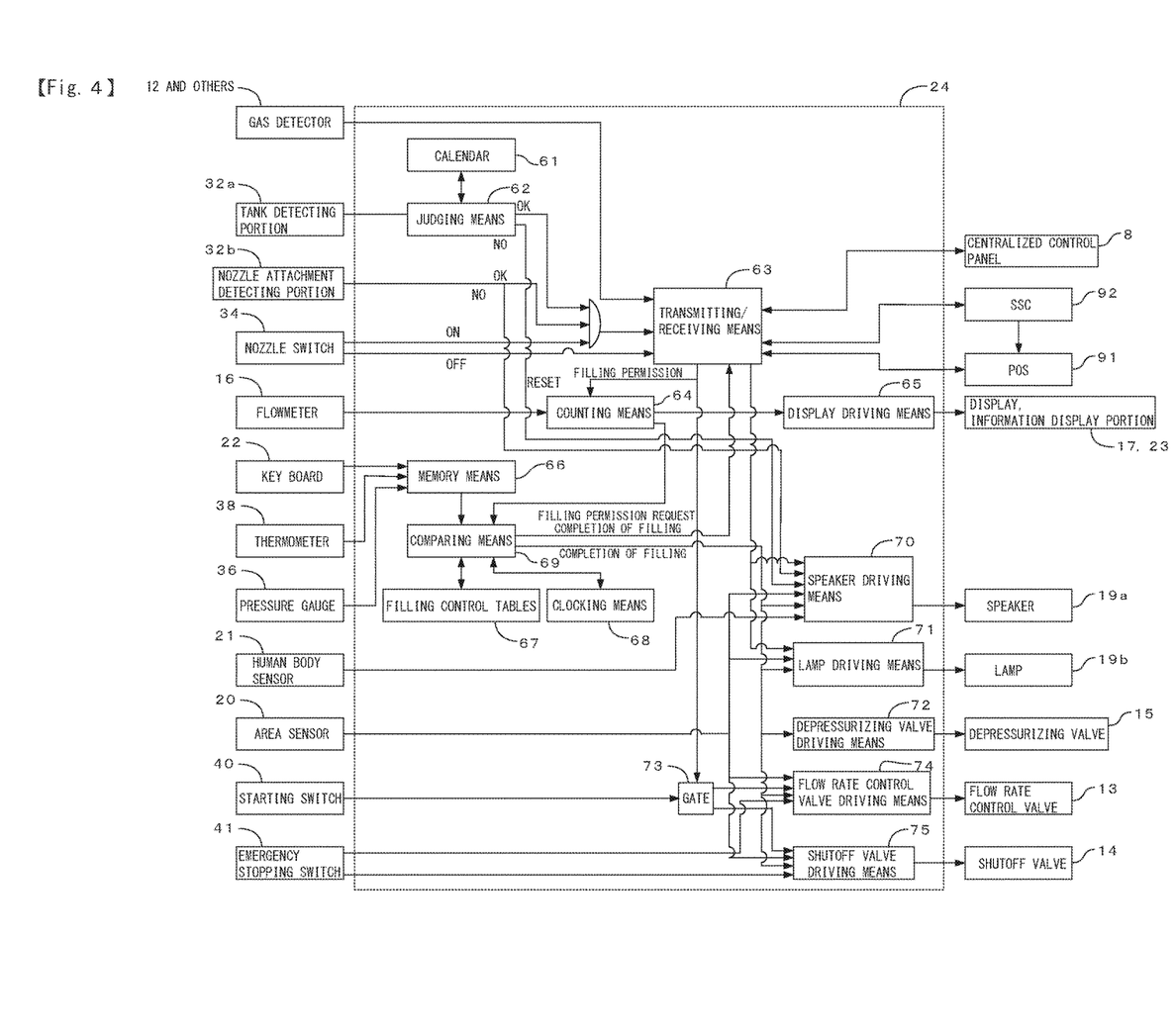
FIG. 4 is a schematic view for explaining a construction of a control device shown in FIG. 2.

The control device 24 is, as shown in FIG. 4, provided with: a calendar 61; judging means 62; transmitting/receiving means 63; counting means 64; display driving means 65; memory means 66; filling control tables 67; clocking means 68; comparing means 69; speaker driving means 70; lamp driving means 71; depressurizing valve driving means 72; a gate 73; flow rate control valve driving means 74; and shutoff valve driving means 75. Switches are described as SWs in the same figure.

The judging means 62 judges whether expiration date of the in-vehicle tank (about 7 years from production date) is passed or not based on the production date of the in-vehicle tank received from the tank detecting portion 32a and calendar 61. In case that the expiration date of the in-vehicle tank is not passed ("OK" by the judging means 62), the judging means 62 sends a signal indicating the state to the transmitting/receiving means 63. On the other hand, in case that the expiration date of the in-vehicle tank is passed ("NO" by the judging means 62), the judging means 62 sends a signal indicating the state to the speaker driving means 70.

The transmitting/receiving means 63 performs transmission/reception of signals in the gas filling apparatus 2, and transmission/reception of signals between the gas filling apparatus 2 and other apparatuses. Particularly, when receiving a signal indicating that the expiration date of the in-vehicle tank is not passed from the tank detecting portion 32a; a signal indicating that the filling nozzle 32 is attached to the filling port 51 ("OK" from the nozzle attachment detecting portion 32b) from the nozzle attachment detecting portion 32b; and an ON signal from the nozzle switch 34, the transmitting/receiving means 63 sends a filling permission request to the SSC 92, and sends a filling permission received from the SSC 92 to the gate 73.

When receiving a reset signal from the transmitting/receiving means 63, the counting means 64 resets count, and counts flow rate pulse signals from a flow rate pulse transmitter of the flowmeter 16 and sends a driving signal that requests returning to zero and displaying counted value to the display driving means 65. The display driving means 65 drives, based on the driving signal, the display 17 and the information display portion 23.

The memory means 66 memorizes numerical values and measured values inputted from the key board 22, the thermometer 38 and the pressure gauge 36. The filling control tables 67 accumulate, for every capacity of the in-vehicle tank, relations among a pressure in the in-vehicle tank before filling, ambient temperature and a target pressure that filling should be finished.

The comparing means (target pressure calculating means) 69 confirms whether a filling set through the key board 22 by a customer can be performed or not based on the measured values of the thermometer 38 and the pressure gauge 36 that are inputted from the memory means 66, and the filling control tables 67. When the filling can be performed, the comparing means 69 sends a filling permission request to the transmitting/receiving means 63. In addition, the comparing means 69, based on the measured values of the thermometer 38 and the pressure gauge 36, and the filling control tables 67, introduces a target pressure and a flow rate at the filling that the filling should be finished, and when the measured value of the pressure gauge 36 reaches the target value at the filling, the comparing means 69 sends a signal indicating completion of the filling through the transmitting/receiving means 63 to each means 71-75 and the POS 91. Further, the comparing means 69, based on the flow rate at filling and the target pressure, calculates a filling completion time until a pressure in the in-vehicle tank reaches the target pressure.

When receiving a signal indicating that expiration date of the in-vehicle tank is passed from the tank detecting portion 32a, a signal indicating that the filling nozzle 32 is not attached to the filling port 51 from the nozzle attachment detecting portion 32b ("NO" from the nozzle attachment detecting portion 32b), a signal indicating completion of filling from the comparing means 69, when not detected the existence of a customer near the gas filling apparatus 2 by the human body sensor 21, and so on, the speaker driving means 70 drives the speaker 19a to inform the above things.

When receiving a signal indicating that gas leakage is detected from the gas detector 12 or the like, and a signal indicating completion of filling from the comparing means 69, the lamp driving means 71 drives the lamp 19b to inform the above things. The lamp driving means 71 can be linked to the speaker driving means 70 so that the lamp 19b can be driven at the timing as same as the above speaker driving means 70.

When receiving a signal indicating that filling is finished to close the shutoff valve 14 from the shutoff valve driving means 75 mentioned below, the depressurizing valve driving means 72 drives the depressurizing valve 15 for a predetermined period of time.

The gate 73 forwards a signal form the starting switch 40 and a signal indicating filling permission from the transmitting/receiving means 63 to the flow rate control valve driving means 74 and the shutoff valve driving means 75.

When receiving a signal indicating filling permission from the transmitting/receiving means 63, the flow rate control valve driving means 74 opens the flow rate control valve 13 at the valve opening specified by the comparing means 69, and the means 74 closes the flow rate control valve 13 when a signal indicating completion of filling is received from the comparing means 69, and when the emergency stopping switch 41 is depressed.

When receiving a signal indicating filling permission from the transmitting/receiving means 63 after a signal is inputted from the starting switch 40, the shutoff valve driving means 75 opens the shutoff valve 14, and closes the shutoff valve 14 when a signal indicating completion of filling from the comparing means 69 is received, and when the emergency stopping switch 41 is depressed.

Next, a motion of the gas filling system 1 with the construction described above will be explained while referring to FIGS. 1 to 5, particularly FIG. 5. In this connection, a case that the hydrogen gas H is filled up the in-vehicle tank will be exemplarily explained.

Figure 5:
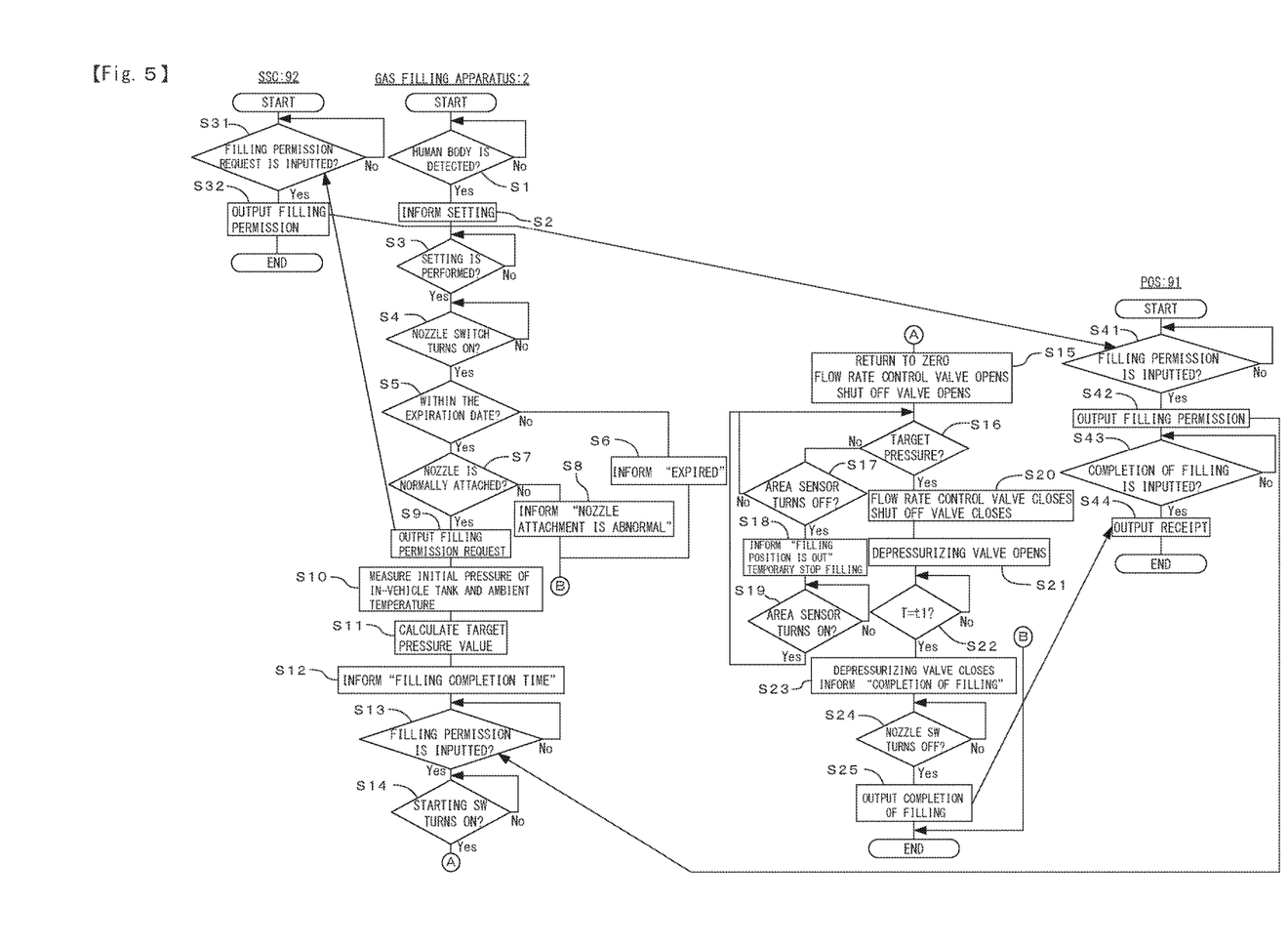
FIG. 5 is a flowchart for explaining a motion of the gas filling apparatus according to the present invention.

In the gas filling apparatus 2, by the human body sensor 21 is detected the existence of a customer near the gas filling apparatus 2 (in step S1). When the human body sensor 21 detects the existence of a customer (in step S1: Yes), information on setting is displayed on the display 17 (in step S2). The information on setting is, for example, "Please press "ENTER" of the key board at full filling." and "Please input filling amount by the key board at preset amount of gas filling.". In case that the existence of a customer cannot be detected in the step S1 (in step S1: No), the gas filling apparatus 2 stands by until it is detected.

Next, it is judged whether the setting is performed by the customer or not (in step S3), in case that it is judged that "ENTER" is depressed to select full filling by the customer (in step S3: Yes), in the step S4, it is judged whether the nozzle switch 34 turns ON or not. In the step S3, in case that it is judged the setting is not performed (in step S3: No), the gas filling apparatus 2 stands by until the setting is performed.

In the step S4, it is judged that the nozzle switch 34 turns ON (in step S4: Yes), in the step S5, the judging means 62 judges whether the expiration date of the in-vehicle tank to which filling is performed is passed or not. Between the step S4 and the step S5, the customer attaches the filling nozzle 32 that is detached from the nozzle hook 33 to the filling port 51 of the in-vehicle tank as shown in FIG. 3(b).

In the step S5, the judging means 62 judges that the expiration date of the in-vehicle tank is not passed (in step S5: Yes), in the step S7, the nozzle attachment detecting portion 32b judges whether the filling nozzle 32 is normally attached to the filling port 51 of the in-vehicle tank. On the other hand, in case that the judging means 62 judges that the expiration date of the in-vehicle tank is passed (in step S5: No), it is informed that the in-vehicle tank is expired through the alarm 19, and the motion of the gas filling apparatus 2 is finished (in step S6).

In the step S7, in case that the nozzle attachment detecting portion 32b detects approach of the nozzle attachment detected portion 32c, and it is judged that the filling nozzle 32 is normally attached to the filling port 51 of the in-vehicle tank (in step S7: Yes), the gas filling apparatus 2 outputs a filling permission request to the SSC 92 (in step S9). On the other hand, in case that the nozzle attachment detecting portion 32b cannot detect the approach of the nozzle attachment detected portion 32c, and it is judged that the filling nozzle 32 is not normally attached to the filling port 51 (in step S7: No), it is informed that the nozzle is abnormally attached through the alarm 19, and the motion is finished (in step S8).

Next, in the SSC 92, it is judged whether the filling permission request is inputted or not (in step S31). In the step S31, in case that the filling permission request is inputted (in step S31: Yes), an operator of a filling station depresses, for example, a button of the SSC 92 corresponding to the gas filling apparatus 2 to which the filling permission is requested to output the filling permission to the gas filling apparatus 2 to the POS 91 (in step S32), the motion of the SSC 92 is finished. In the step S31, in case that the filling permission request is not inputted (in step S31: NO), the SSC 92 stands by until the request is inputted.

The POS 91 judges whether the filling permission is inputted or not (in step S41). In the step S41, when it is judged that the filling permission is inputted (in step S41: Yes), the POS 91 outputs the filling permission to the gas filling apparatus 2 (in step S42). In the step S41, when the filling permission is not inputted (in step S41: No), the POS 91 stands by until the filling permission is inputted.

Returning to the gas filling apparatus 2, in the step S10, a pressure in the in-vehicle tank before filling (initial pressure in the in-vehicle tank) and ambient temperature are measured, and in the step S11, a target pressure is calculated based on these measured values and the filling control tables 67. Further, after the filling completion time is calculated based on the target pressure and the flow rate, the filling completion time is informed through the speaker 19a (in step S12). The filling completion time can be displayed on the display 17.

In the step S13, it is judged that the filling permission is inputted from the POS 91, and when it is judged that the filling permission is inputted (in step S13: Yes), it is judged whether the starting switch 40 is depressed or not (in step S14). In the step S13, in case that the filling permission is not inputted (in step S13: No), the gas filling apparatus 2 stands by until the filling permission is inputted.

In the step S14, when it is judged that the starting switch 40 is depressed (in step S14: Yes), in the step S15, the display 17 returns to zero, and the flow rate control valve 13 and the shutoff valve 14 are opened. In the step S14, in case that the starting switch 40 is not depressed (in step S14: No), the gas filling apparatus 2 stands by until the switch 40 is depressed.

Next, in the step S16, it is monitored whether the pressure in the in-vehicle tank reaches the target pressure or not. Until the pressure in the in-vehicle tank reaches the target pressure (in step S16: No), in the step S17, it is monitored whether the area sensor 20 is OFF or not, and when it is judged that the area sensor 20 is OFF (in step S17: Yes), in the step S18, that the customer is out of the filling position is informed through the speaker 19a or the like, and the filling operation is suspended, and in the step S19, the gas filling apparatus 2 stands by until the area sensor 20 turns ON.

Then, in the step S16, when it is judged that the pressure in the in-vehicle tank reaches the target pressure (in step S16: Yes), the flow rate control valve 13 and the shutoff valve 14 are closed (in step S20), and the depressurizing valve 15 is opened to decrease pressure by discharging the hydrogen gas H between the shutoff valve 14 and the filling nozzle 32 through the diffusion pipe (in step S21).

It is judged whether a depressurizing time T by the depressurizing valve 15 reaches a predetermined time t1 or not (in step S22). In the step S22, when it is judged that the depressurizing time T reaches the predetermined time t1 (in step S22: Yes), the depressurizing valve 15 is closed, and completion of filling is informed through the display 7 and the alarm 19 to the customer (in step S23). In the step S22, when it is judged that the depressurizing time T does not reach the predetermined time t1 (in step S22: No), the gas filling apparatus 2 stands by until the time T reaches the predetermined time t1.

When confirming completion of filling, the customer detaches the filling nozzle 32 from the filling port 51 of the in-vehicle tank to hang it on the nozzle hook 33. Here, it is judged whether the filling nozzle 32 is hung on the nozzle hook 33 and the nozzle switch 34 turns OFF or not (in step S24).

In the step S24, in case that the nozzle switch 34 turns OFF (in step S24: Yes), in the step S25, a completion of filling is outputted to the POS 91, and the motion of the gas filling apparatus 2 is finished. In the step S24, in case that the nozzle switch 34 does not turn OFF (in step S24: No), the gas filling apparatus 2 stands by until the switch 34 turns OFF.

In the POS 91, it is judged that the completion of filling is inputted from the gas filling apparatus 2 (in step S43). In the step S43, when it is judged that the completion of filling is inputted (in step S43: Yes), in the step S44, after a receipt for the present filling is outputted, and the motion of the POS 91 is finished. On the other hand, in the step S43, in case that the completion of filling is not inputted (in step S43: No), the POS 91 stands by until the completion of filling is inputted.

DESCRIPTION OF THE REFERENCE NUMERALS 1 gas filling system
2 gas filling apparatus
3 refrigerant cooling apparatus
4 compressor
5 accumulator
6 truck
7 curdle
8 centralized control panel
9 (9A, 9B) refrigerant carrying pipes
10 main body unit
10a filling section
10b display section
11 gas passage cooling section
12 gas detector
13 flow rate control valve
14 shutoff valve
15 depressurizing valve
16 flowmeter
17 display
18 gas detector
19 alarm
19a speaker
19b lamp
20 area sensor
21 human body sensor
22 key board
23 information display portion
24 control device
25 inert gas pipe
30 hose unit
31 filling hose
32 filling nozzle
32a tank detecting portion
32b nozzle attachment detecting portion
32c nozzle attachment detected portion
32d conductive cover
32e concave portion
32f hole portion
33 nozzle hook
34 nozzle switch
35, 36 pressure gauges
37 gas detector
38 thermometer
39 safety coupling
40 starting switch
41 emergency stopping switch
42 master valve
43, 44 (44A, 44B) gas carrying pipes
45 heat insulator
51 filling port (of in-vehicle tank)
51a tank detected portion
51b end portion
61 calendar
62 judging means
63 transmitting/receiving means
64 counting means
65 display driving means
66 memory means
67 filling control tables
68 clocking means
69 comparing means
70 speaker driving means
71 lamp driving means
72 depressurizing valve driving means
73 gate
74 flow rate control valve driving means
75 shutoff valve driving means
81, 82 thermometers
83 pressure gauge
84 gas detector
85 flame detector
91 POS
92 SSC

What is claimed is:

1. A gas filling apparatus comprising:
a filling mechanism, including a gas carrying pipe and at least one valve, for carrying a gas from a gas supply source while measuring flow rate of the gas;
a filling hose connected to the gas carrying pipe and having a filling nozzle at an end of the filling hose;
an attachment sensor for outputting a detection signal after detecting that the filling nozzle is attached to a filling port of an in-vehicle tank;
a calculating circuit for, before filling the gas to the in-vehicle tank, calculating time that the pressure in the in-vehicle tank reaches a target pressure based on flow rate of the gas carried by the gas carrying pipe; and
an informing circuit for, before filling the gas to the in-vehicle tank, transmitting the time that the pressure in the in-vehicle tank reaches the target pressure;
wherein filling gas to the in-vehicle tank by the filling mechanism becomes possible after the detection signal is inputted to the filling mechanism from the attachment sensor.

2. The gas filling apparatus as claimed in claim 1, further comprising:
a pressure gauge for measuring a pressure in the in-vehicle tank;
a thermometer for measuring ambient temperature around said gas filling apparatus; and
the calculating circuit additionally calculating a pressure in the in-vehicle tank when filling up the in-vehicle tank or filling preset amount of the gas is finished before filling gas to the in-vehicle tank based on a capacity of the in-vehicle tank and the measured pressure in the in-vehicle tank and the measured ambient temperature;
wherein said filling mechanism stops carrying the gas to the in-vehicle tank when the pressure in the in-vehicle tank reaches the target pressure.

3. The gas filling apparatus recited in claim 1, wherein the informing circuit includes a speaker controller operative to generate speaker control instructions, the gas filling apparatus further comprising a speaker capable of operating in accordance with the speaker control instructions.

4. The gas filling apparatus recited in claim 1, wherein the informing circuit includes a display controller operative to generate display control instructions, the gas filling apparatus further comprising a display capable of operating in accordance with the display control instructions.

5. A gas filling apparatus comprising:
a gas carrying pipe fluidly connectable with a gas supply source to receive gas therefrom;
at least one valve in fluid communication with the gas carrying pipe;
a filling hose connected to the gas carrying pipe and having a filling nozzle at an end of the filling hose;

an attachment sensor for outputting a detection signal after detecting that the filling nozzle is attached to a filling port of an in-vehicle tank;

a calculating circuit for calculating time that the pressure in the in-vehicle tank reaches a target pressure based on flow rate of the gas carried by the gas carrying pipe; and an informing circuit for transmitting the time that the pressure in the in-vehicle tank reaches the target pressure as calculated by the calculating circuit;

wherein filling gas to the in-vehicle tank by the filling mechanism becomes possible after the detection signal is outputted by the attachment sensor.

* * * * *